_United States Patent_ [19]

van der Lely

[11] 4,161,991

[45] Jul. 24, 1979

[54] TRACTORS

[76] Inventor: Cornelis van der Lely, 7, Brüschenrain, Zug, Switzerland

[21] Appl. No.: 919,854

[22] Filed: Jun. 28, 1978

Related U.S. Application Data

[63] Continuation of Ser. No. 683,940, May 6, 1976, Pat. No. 4,131,170.

[30] Foreign Application Priority Data

May 12, 1975 [NL] Netherlands ................. 7505526

[51] Int. Cl.² .................. B60K 17/28; B60K 5/08
[52] U.S. Cl. ........................... 180/53 FE; 180/54 C; 180/311
[58] Field of Search .............. 180/54 C, 54 R, 53 FE, 180/64 R, 1 F, 53 D

[56] References Cited

U.S. PATENT DOCUMENTS

| 2,366,646 | 1/1945 | Orr ..................... 180/54 C |
| 2,689,621 | 9/1954 | Donley ................. 180/54 C |
| 3,262,513 | 7/1966 | Henrikssen et al. ..... 180/54 C |
| 3,347,558 | 10/1967 | Grimes et al. ........ 180/77 S |
| 3,690,395 | 9/1972 | Spiller et al. ........ 180/53 R |
| 3,693,744 | 9/1972 | Horn et al. ........... 180/54 R |
| 3,921,742 | 11/1975 | May et al. ............ 180/50 |

_Primary Examiner_—Joseph F. Peters, Jr.
_Assistant Examiner_—Donn McGiehan
_Attorney, Agent, or Firm_—Penrose Lucas Albright; William B. Mason

[57] ABSTRACT

A tractor having two internal combustion engines which are spaced apart on either side of the longitudinal axis of the tractor and are covered with separate spaced apart cowlings, the driveable rear wheels of the tractor numbering four or six and being mounted on an axle extending laterally from a narrow part of the tractor's body, an enclosed operator's seat and controls spaced above the rear wheels, the seat and controls being selectively rotatable to positions 180 degrees apart whereby the operator optionally faces forward or to the rear, the tractor having forward and rear lifting devices substantially fully visible from the operator's seat between, in front, the spaced-apart engines, the engines, which are identical, being connected through clutches and a gear train to the rear wheels via a torque converter and to a power take-off shaft extending forward and aft, the tractor's frame being a central horizontal beam and cross-beams rigidly connected thereto.

10 Claims, 7 Drawing Figures

TRACTORS

RELATED APPLICATION

This is a continuation of application Ser. No. 683,940 filed May 6, 1976 now U.S. Pat. No. 4,131,170.

SUMMARY OF THE INVENTION

This invention relates to tractors of the kind which comprise means for the attachment thereto of tools, implements, machines, containers and the like, the tractor being provided with at least one lifting device or hitch that affords said means or is independent thereof.

According to one aspect of the invention, there is provided a tractor of the kind set forth, wherein at least two engines are provided both or all of which can drive at least the ground wheels of the tractor.

For a better understanding of the invention, and to show how the same may be carried into effect, reference will now be made, by way of example, to the accompanying drawings, in which:

DESCRIPTION OF THE PREFERRED EMBODIMENT

Figure 1:
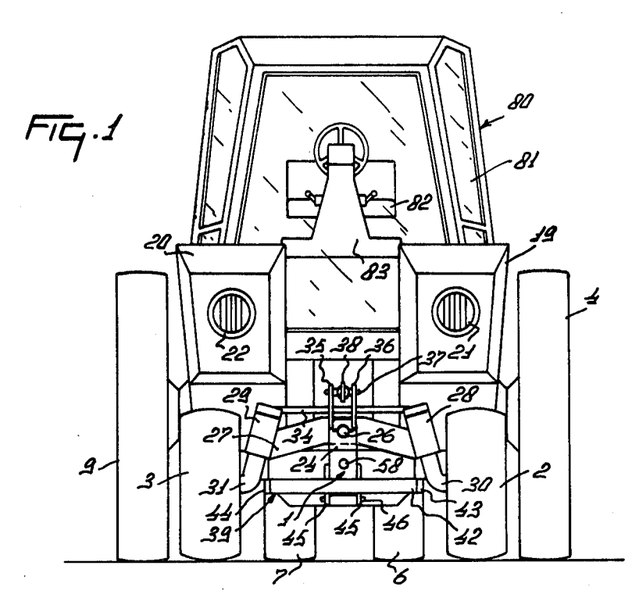
FIG. 1 is a front elevation of an agricultural tractor in accordance with the invention.
Figure 2:
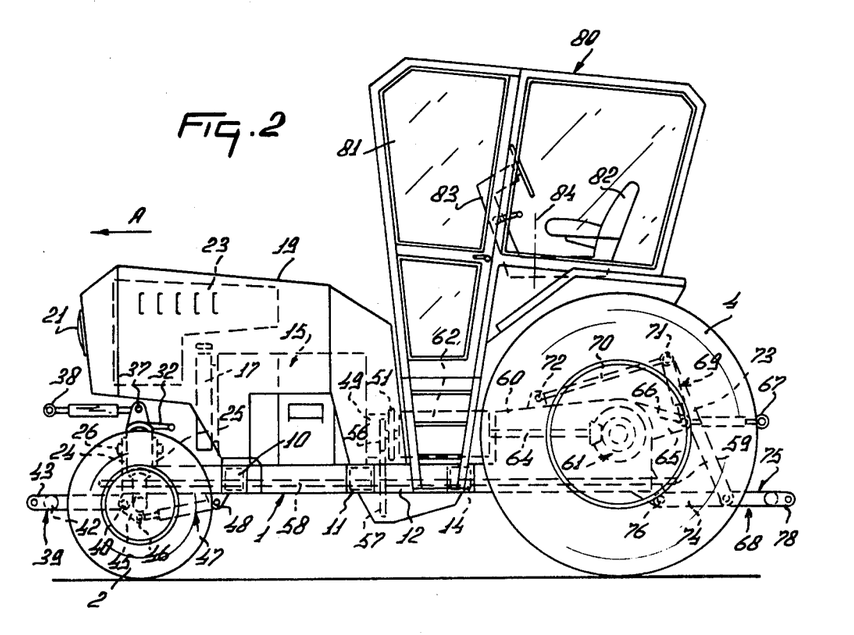
FIG. 2 is a side elevation of the tractor of FIG. 1.
Figures 3, 4, 5:
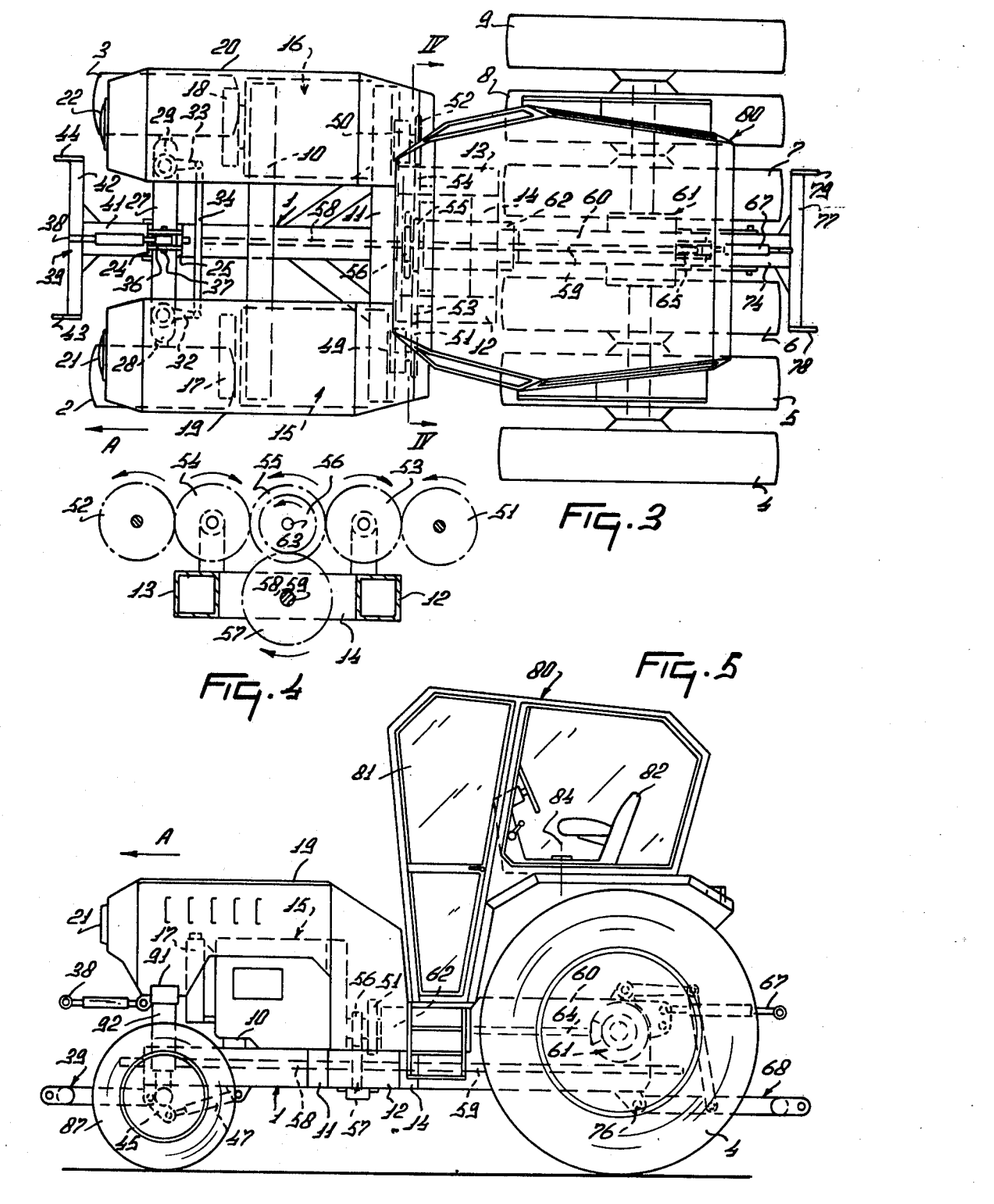
FIG. 3 is a plan view of the tractor of FIGS. 1 and 2.
FIG. 4 is a part-sectional elevation, to a slightly enlarged scale, the section being taken on the line IV—IV in FIG. 3.
FIG. 5 is a side elevation of an alternative form of agricultural tractor in accordance with the invention.

Referring to FIGS. 1 to 4 of the accompanying drawings, the agricultural tractor that is illustrated therein has a frame that is generally indicated by the reference numeral 1, said frame being supported from the ground by a pair of front wheels 2 and 3 and six larger rear wheels 4, 5, 6, 7, 8 and 9. The frame 1 comprises a central hollow beam of square, or substantially square, cross-section that extends substantially longitudinally parallel to the intended direction of straight forward travel of the tractor that is indicated by an arrow A in FIGS. 2 and 3 of the drawings and in a similar way in FIGS. 5 and 6 of those drawings in respect of the further embodiment that will be described below. The tractor is substantially symmetrical with respect to a vertical plane that is parallel to the direction A, said plane containing the longitudinal axis of the central beam of the frame 1. The leading end of said central beam is located substantially midway between the two front wheels 2 and 3 and extends rearwardly therefrom, with respect to the direction A, to a location that is substantially midway between the coplanar axes of rotation of the front wheels 2 and 3 (when those wheels are disposed for straight travel) and the common axis of rotation of the six rear wheels, when the tractor is viewed in plan (FIG. 3). The width of the frame 1 measured in a direction that is horizontally perpendicular to the direction A is less than the width or thickness of one of the tires of one of the rear wheels 4 to 9 inclusive. A supporting beam 10 has its midpoint secured to the central beam of the frame 1, in such a way that the supporting beam 10 is in perpendicular relationship with said central beam, at a location which, as seen in plan view, is immediately to the rear of the front wheels 2 and 3, the supporting beam 10 actually being located at a level just above that of the axes of rotation of those wheels. The beam 10 projects by equal distances from opposite sides of the central beam of the frame 1 and, at a point which is substantially midway between the coplanar axes of rotation of the front wheels 2 and 3 (when those wheels are disposed for straight travel) and the common axis of rotation of the rear ground wheels 4 to 9 inclusive, as seen in plan view, a second supporting beam 11 is similarly secured to the central beam of the frame 1 so as to extend parallel to the supporting beam 10 and so as to project by equal distances from opposite sides of that beam. In fact, the second supporting beam 11 is located at the rear end of the central beam of the frame 1 and closes off that hollow rear end.

Two beams 12 and 13 have their rear ends secured to the second supporting beam 11 and extend substantially horizontally rearwardly therefrom in parallel relationship, said beams 12 and 13 being disposed symmetrically with respect to the aforementioned plane of substantial symmetry of the tractor. The two beams 12 and 13 are also in parallel relationship with the direction A and are spaced apart from one another by substantially half the transverse length of the second supporting beam 11, the points at which their leading ends are secured to that beam 11 being approximately midway between the junction of the beam 11 with the central beam of the frame 1 and the corresponding free ends of the beam 11, respectively. The rear ends of the beams 12 and 13 are located very short distances in front of the ground wheels 6 and 7 respectively, as seen in plan view (FIG. 3), and are interconnected by a horizontal tie beam 14 that extends parallel to the supporting beams 10 and 11. It will be noted from FIG. 3 of the drawings that, as seen in that Figure, a supporting frame which is afforded by part of the second beam 11, the two beams 12 and 13 and the tie beam 14 is of an oblong shape that does not deviate greatly from square.

The two limbs of each supporting beam 10 and 11 that project from opposite sides of the central beam of the frame 1 serve to carry two internal combustion engines 15 and 16, each engine having a crankshaft whose axis of rotation is parallel to the direction A. The engine 15 is spaced a significant distance to the left-hand side of the aforementioned plane of substantial symmetry of the tractor, when the latter is viewed from the rear in the direction A, and the engine 16 is symmetrically located at the right-hand side of said plane. Thus, the engine 15 is carried by left-hand end regions of the supporting beams 10 and 11 and has its right-hand side spaced by a considerable distance from the imaginary plane of substantial symmetry of the tractor while the engine 16 is carried by the right-hand ends of the supporting beams 10 and 11 and has its left-hand side spaced by a substantially equal distance from the right-hand side of said plane of substantial symmetry. In fact, the distance between the relatively facing sides of the two engines 15 and 16 is not less than approximately equal to the width of either engine 15 or 16 in a substantially horizontal direction that is perpendicular to the direction A. The two engines 15 and 16 are identical, each of them having a maximum rating of between substantially 100 horsepower and substantially 150 horsepower. Since the two engines 15 and 16 are identical, their crankshafts rotate in the same directions during operation and the engines are thus interchangeable. Each of the two engines 15 and 16 has a length in the direction A that is substantially equal to the spacing between the front of the supporting beam 10 and the rear of the second supporting beam 11. The engines are water-cooled and corresponding radiators 17 and 18 lie closely in front of them with respect to the direction A. However, the engine 15 and radiator 17 are provided with cowling plates 19 while the engine 16 and radiator 18 are provided with separate cowling plates 20. As can be seen in the drawings, the cowling plates 19 and 20 are disposed very close to the opposite lateral sides of the corresponding engines 15 and 16 and enclose those engines laterally, at the top and at the front, the cowling plates 19 and 20 extending forwardly beyond the engines 15 and 16 and the radiators 17 and 18 to locations that are close to the fronts of the ground wheels 2 and 3 with respect to the direction A. Left and right headlamps 21 and 22 are carried by substantially vertical plates that close the fronts of the engine compartments that are afforded by the corresponding cowling plates 19 and 20. An open space is left between the inner cowling plates 19 and 20 that has a width which is substantially equal to the width of one of the engines 15 and 16 when measured in a horizontal direction that is perpendicular to the direction A. A liquid fuel tank 23 for the engine 15 is arranged inside the engine compartment that is afforded by the cowling plates 19 at a location substantially vertically above the corresponding ground wheel 2, principally in front of the engine 15 with respect to the direction A and, to a considerable extent, at a level above that of the engine 15. A substantially symmetrically indentical liquid fuel tank that is not illustrated in the drawings is provided for the engine 16 in a symmetrically identical position in the compartment that is afforded by the cowling plates 20.

Two vertical lugs 24 and 25 whose planes are perpendicular to the direction A project upwardly from the top of the central beam of the frame 1 at the leading end of that beam, the lug 25 being spaced a short distance rearwardly from the parallel lug 24. The lugs carry a strong pivotal shaft 26 that defines an axis which is substantially horizontally parallel to the direction A, said axis being contained in the aforementioned imaginary plane of symmetry of the tractor. A support 27 that is of symmetrical shape with respect to the plane that has just been mentioned is rockable about the pivotal shaft 26 and projects from both opposite sides of that shaft in directions that are inclined downwardly by a few degrees with respect to the horizontal. Sleeve bearings 28 and 29 are secured to the opposite free ends of the support 27 in such a way that, as seen in front elevation (FIG. 1), the axes defined by said sleeve bearings 28 and 29 are downwardly divergent. Corresponding king pins are turnably arranged in the sleeve bearings 28 and 29 and are rigid, or integral, with corresponding horizontal or substantially horizontal axles 30 and 31 upon which axles the two front ground wheels 2 and 3 are rotatably mounted in a manner which may be generally known per se. Arms 32 and 33 are fastened to the uppermost ends of the king pins that are turnably mounted in the sleeve bearings 28 and 29 so as to extend generally rearwardly from those king pins, the rearmost ends of said arms 32 and 33 being pivotally interconnected, in a generally known manner, by a track rod 34 that extends substantially horizontally perpendicular to the direction A and that, preferably, is of adjustable length. A driving cabin 80 which will be referred to again below contains a steering wheel and that steering wheel is operatively connected in a manner that is not illustrated in the drawings to the members 32, 33 and 34 in such a way that turning said steering wheel will steer the front ground wheels 2 and 3 to the left, or to the right, as may be required.

Since the two front wheels 2 and 3 are both indirectly connected to the support 27, they are rockable, with that support 27, relative to the frame 1 about the axis that is defined by the pivotal shaft 26, the arrangement being such that said wheels 2 and 3 rock in common about said axis with elevation of the wheel 2 being accompanied by downward displacement of the wheel 3 and vice versa. The tops of the lugs 24 and 25 that project upwardly from a leading region of the central beam of the frame 1 are interconnected by further lugs 35 and 36 that are again substantially vertically disposed in parallel relationship but with the general planes of said lugs parallel, rather than perpendicular, to the direction A, said lugs 35 and 36 being positioned at opposite sides of the imaginary vertical plane of substantial symmetry of the tractor that extends parallel to the direction A. A horizontally disposed pivotal shaft 37 that extends perpendicular to the direction A is carried by the tops of the lugs 35 and 36 and a forwardly projecting upper link 38 of a leading three-point lifting device or hitch 39 of the tractor has one of its ends turnable about the pivotal shaft 37 between the lugs 35 and 36. As is conventional, the upper link 38 is of adjustable length. A lower element of the three-point lifting device or hitch 39 is turnable upwardly and downwardly about a substantially horizontally disposed pivot 40 that is carried by the frame 1 so as to extend parallel, or substantially parallel, to the movable axis that is defined by the pivotal shaft 37. Said lower element of the three-point lifting device or hitch 39 comprises a plate-shaped arm 41 whose width, as seen in plan view, is substantially the same as that of the central beam of the frame 1 (see FIG. 3). The length of the plate-shaped arm 41 is substantially the same as the radius of one of the two front ground wheels 2 and 3 and the front of said arm 41 carries a transverse beam 42 that extends substantially horizontally for equal distances from opposite sides of said arm 41, and from opposite sides of the imaginary plane of substantial symmetry of the tractor, the opposite free ends of the beam 42 being provided with coupling plates 43 and 44. The coupling plates 43 and 44 comprise the two lower fastening points of the three-point lifting device or hitch 39 and the end of the upper link 38 that is remote from the pivotal shaft 37 comprises the third upper fastening point of said device or hitch 39. Lugs 45 are inclined downwardly and rearwardly with respect to the direction A away from the plate-shaped arm 41 close to the axis defined by the pivot 40, the free ends of said lugs 45 supporting a substantially horizontal pivot pin 46 that is in parallel relationship with the pivot 40. The outer end of the piston rod of a hydraulic piston and cylinder assembly 47 is turnably connected to the pivot pin 46, between the lugs 45, the base of the cylinder of said assembly 47 being pivotable about a parallel pin 48 which is carried by lugs that depend from the central beam of the frame 1 very close to the junction of that beam with the leading supporting beam 10. As will be seen from FIG. 2 of the drawings, at least part of the hydraulic piston and cylinder assembly 47 is located at a horizontal level which is lower than that of the lower element of the three-point lifting device or hitch 39 and either of the coupling plates 43 and 44 that are carried by that element.

Each of the two internal combustion engines 15 and 16 has a rearwardly directed output shaft that is arranged to drive the input of a corresponding clutch 49 or 50. The clutches 49 and 50 may be actuated either mechanically or hydraulically in a manner that is not illustrated in the drawings from controls contained within the cabin 80. The two clutches 49 and 50 have output shafts upon which corresponding straight-toothed or spur-toothed pinions 51 and 52 (FIGS. 2, 3 and 4) are mounted. The general planes of the two pinions 51 and 52 coincide and their axes of rotation are at the same distance from opposite sides of the imaginary plane of substantial symmetry of the tractor. The teeth of the pinion 51 are in driving mesh with those of a substantially coplanar straight-toothed or spur-toothed pinion 53 of the same size and, similarly, the teeth of the pinion 52 mesh with those of a similarly toothed coplanar pinion 54 that is also of the same size. The two pinions 53 and 54 are located between the pinions 51 and 52 and the imaginary plane of substantial symmetry of the tractor and the teeth of both pinions 53 and 54 are in mesh with those of a central pinion 55 which is coplanar with the pinions 51 to 54 inclusive, which is straight-toothed or spur-toothed and which is of the same, or substantially the same, size as the four pinions 51 to 54 inclusive. The axis of rotation of the central pinion 55 is contained in the imaginary plane of substantial symmetry of the tractor. Said axis of rotation is, in fact, afforded by a substantially horizontal shaft 63 to which the central pinion 55 is rigidly secured, a second smaller toothed pinion 56 also being secured to the shaft 63 immediately in front of the pinion 55 with respect to the direction A. The teeth of the pinion 56 are in driving mesh with those of a larger pinion 57 whose axis of rotation is parallel to that of the shaft 63, the axis of rotation of the pinion 57 also being contained in the imaginary plane of substantial symmetry of the tractor. The shaft that affords the axis of rotation of the pinion 57, and to which said pinion 57 is secured, is a driving shaft for both a leading power take-off shaft 58 and a rear power take-off shaft 59 of the tractor and it will be seen from the drawings that a major part of the length of the shaft 58 is disposed inside the hollow central beam of the frame 1.

The clutches 49 and 50 and the pinions 51 to 57 inclusive are all accommodated in a housing 60 that is secured to the aforementioned supporting frame afforded by part of the beam 11 and by the beams 12 and 13 and the tie beam 14. The housing 60 may be a single cast unit or a plurality of metal sheets interconnected by welding. In either case, it may extend rearwardly, as illustrated, beyond the common axis of rotation of the rear wheels 4 to 9 inclusive in which case it constitutes a rearward supporting frame portion of the central beam of the frame 1. The housing 60 then carries a differential 61 for the distribution of driving torque to the rear wheels that are at the left and right sides of the plane of substantial symmetry of the tractor, respectively, said housing 60 also carrying a torque converter 62 that may be a mechanical gear box controlled from the driving cabin 80 or a hydraulic torque converter that is manually controlled from the driving cabin 80 or that is of semi-automatic or automatic construction. The aforementioned shaft 63 is the rotary input shaft of the torque converter 62, said torque converter 62 being located immediately to the rear of the central pinion 55 and being provided with a single rotary output shaft 64 that is also the input shaft of the differential 61. As seen in plan view (FIG. 3), the housing 60, which is rigidly secured to the frame 1, has a width which is less than that of the tire of any one of the six rear ground wheels 4 to 9. The casing of the differential 61 extends laterally into the cavities that are formed in a conventional manner inside the rims of the innermost pair of rear ground wheels 6 and 7.

A pair of lugs 65 projects rearwardly with respect to the direction A from the top and rear of the housing 60, said lugs 65 being vertically disposed in parallel and closely adjacent relationship. The rearmost ends of the lugs 65 carry a horizontal pivot 66 that extends perpendicular to the direction A and an upper lifting link 67, of adjustable length, is turnable upwardly and downwardly about the pivot 66 between the lugs 65, said link 67 forming part of a rear three-point lifting device or hitch 68 of the tractor. In addition to pivotally supporting the upper lifting link 67, the pivot 66 turnably couples the outer end of the piston of a hydraulic piston and cylinder assembly 69 to the lugs 65 and thus to the housing 60. The assembly 69 extends upwardly away from the pivot 66 and is inclined forwardly with respect to the direction A at a few degrees relative to the strictly vertical. The upper end of the cylinder of the assembly 69, that is remote from the pivot 66, is turnably connected by a horizontal pivot 71 that is parallel to the pivot 66 to the rearmost end of a connecting rod 70 which extends away from the pivot 71 in a downwardly and forwardly inclined direction with respect to the direction A. The leading end of the rod 70 is turnably connected by a further parallel pivot 72 to anchorage lugs which project upwardly from the top of the housing 60 at a short distance rearwardly from the back of the torque converter 62. The connecting rod 70 preferably has an effective length which is not less than the radius of any one of the rear ground wheels 4 to 9 inclusive of the tractor so that, upon extension or retraction of the piston rod of the assembly 69, the pivot 71 will be raised or lowered in a substantially, although not strictly, vertical direction. The upper end of a strip-shaped pull rod 73 is also turnably connected to the pivot 71, said pull rod 73 extending downwardly, and rearwardly with respect to the direction A, from the pivot 71 to have its lowermost and rearmost end pivotally connected to an arm 74 which affords a major component of a lower element 75 of the rear three-point lifting device or hitch 68. As seen in plan view (FIG. 3), the arm 74 has a width in a horizontal direction which is perpendicular to the direction A that is substantially the same as the width of the housing 60 when considered in the same direction. The leading end of the plate-shaped arm 74 is turnably connected to lugs at the rearmost end of the housing 60 by a horizontal pivot 76 that extends perpendicular to the direction A. The length of the plate-shaped arm 74 is such that it extends rearwardly beyond the pivotal connection thereto of the lowermost end of the pull rod 73 to a location that is also behind the rear ground wheels 4 to 9 inclusive with respect to the direction A. The rearmost end of the arm 74 is perpendicularly connected to a central region of a transverse beam 77, the longitudinal axis of which is perpendicular to the direction A, the opposite free ends of the beam 77 being provided with corresponding rearwardly orientated coupling plates 78 and 79 which coupling plates 78 and 79 afford the two lower coupling points of the three-point lifting device or hitch 68.

The previously mentioned driving cabin 80 is arranged above the housing 60 and is provided at at least one side with a side entrance door 81 having a lower edge is disposed at a horizontal level just above that of the top of the housing 60. The height of the lower edge of the side entrance door 81 above ground level is equal to between substantially 60% and substantially 70% of the overall diameter of any one of the six rear ground wheels 4 to 9 inclusive. A leading portion of a floor of the driving cabin 80 is disposed at substantially the same horizontal level as is the lowermost edge of the door 81 and the distance between this floor portion and a roof of the cabin 80 is sufficient to enable a person whose height does not greatly exceed the average to stand upon said floor portion without stooping. The cabin 80 contains a driving seat 82, the seat 82 being located immediately above a further portion of the floor of the cabin 80 which further portion is at a distance above the ground surface which is equal to between substantially 100% and substantially 120% of the overall diameter of any one of the six rear ground wheels 4 to 9 inclusive of the tractor. The steering wheel and other control members for the travel and operation of the tractor are carried by a support 83 to which support 83 the seat 82 is also connected. This whole assembly is turnable through 180° about a vertical axis 84 (FIG. 2) between the illustrated straight forward facing position of the seat 82 and an alternative straight rearwardly facing position of that seat. In either of these two positions, the turnable assembly is located wholly inside the cabin 80 and means which is not illustrated in the drawings is, of course, provided to retain the turnable assembly in either of the two alternative operative positions about the axis 84. The connections between the steering wheel and the other control members that are carried by the support 83 and the parts of the tractor, the operations of which those control members govern do not form the subject of the present invention and may be of any known or other kind that allow said control members to perform their appointed functions in either of the two operative positions of the assembly that includes the support 83 about the axis 84. When the assembly has been turned through 180° about the axis 84 as compared with the position illustrated in FIGS. 1 and 2 of the accompanying drawings, said assembly will be appropriately disposed for "forward" travel of the tractor in a direction opposite to the direction A with the tractor driver able directly to supervise the working of any tool or implement coupled to the "rear" lifting device or hitch 68.

When the assembly which includes the support 83 is disposed as illustrated in FIGS. 1 and 2 of the drawings, the tractor driver who occupies the seat 82 has an excellent forward view of the three-point lifting device or hitch 39 and any tool or implement that may be coupled thereto because a direct line of vision is possible between the driver occupying the seat 82 and the general region of the three-point lifting device or hitch 39 through the space between the innermost of the cowling plates 19 and 20 that correspond to the two engines 15 and 16. In particular, the driver can directly see what takes place during manoeuvring to couple the upper link 38 and the plates 43 and 44 to the co-operating coupling members carried by a tool or implement. The control members for operation of the clutches 49 and 50 are connected to the support 83 and form parts of the assembly that is angularly displaceable about the axis 84. The clutch control members may be pedals arranged in a conventional manner to connect the engines 15 and 16 drivingly to the input shaft 63 of the torque converter 62 but, additionally or alternatively, the clutch control members comprise levers that can be set to maintain the corresponding clutches 49 and 50 in ineffective non-transmitting conditions. With this arrangement, either of the two engines 15 and 16 may be left inoperative with the corresponding clutch 59 or 60 temporarily maintained disconnected so that the other engine alone can be coupled to the input shaft 63 of the torque converter 62 by way of the corresponding clutch. It will be noted from the drawings that the rear power take-off shaft 59 extends for a major part of its length through the interior of the housing 60 which housing is provided with appropriately positioned rotary bearings for said shaft 59.

Figure 6:
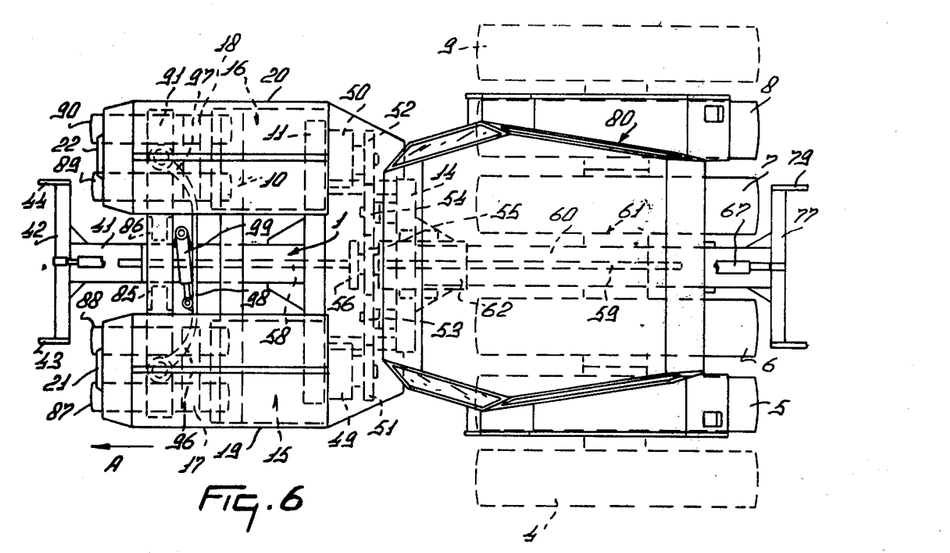
FIG. 6 is a plan view of the tractor of FIG. 5.
Figure 7:
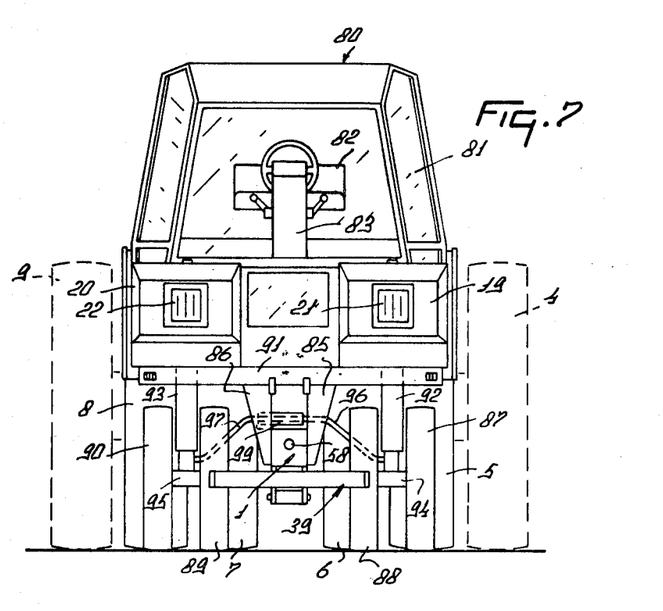
FIG. 7 is a front elevation of the tractor of FIGS. 5 and 6.

A major component of the weight of the two engines 15 and 16 is sustained from the ground surface by the front ground wheels 2 and 3 and, when a tool or implement is operatively connected to the leading three-point lifting device or hitch 39, at least part of the weight of that tool or implement is also sustained from the ground surface through the intermediary of the wheels 2 and 3. FIGS. 5 to 7 of the drawings illustrate an alternative agricultural tractor in accordance with the invention in which the construction and mounting of front ground wheels is strengthened as compared with the construction that has already been described with reference to FIGS. 1 to 4 of the drawings. A large majority of the parts of the tractor that is illustrated in FIGS. 5 to 7 of the drawings are similar, or identical, to parts that have already been described and, accordingly, such parts are indicated in FIGS. 5 to 7 of the drawings by the same references as have already been employed in FIGS. 1 to 4 thereof. Two supports 85 and 86 that are channel-shaped when seen in plan view (FIG. 6) have their bases secured to opposite sides of the central beam of the frame 1 at locations very close to the leading end of that beam in such a way that the limbs of said supports project towards the opposite sides of the tractor from said beam in perpendicular relationship with the direction A. The supports 85 and 86 are also (FIGS. 6 and 7) in register with the axes of rotation of the front wheels of the tractor when those front wheels are disposed for straight travel. The two supports 85 and 86 are symmetrically arranged at the opposite sides of the imaginary plane of substantial symmetry of the tractor which has been referred to above in connection with the embodiment of FIGS. 1 to 4 of the drawings and, as seen in front elevation (FIG. 7), each of the two supports is of substantially triangular configuration. The substantially vertically disposed bases of the two supports 85 and 86 are welded to the opposite sides of the central beam of the frame 1 and said supports project above the top of that beam to a level which is spaced from the ground surface by a distance that has a magnitude of between substantially 100% and substantially 110% of the overall diameter of any one of four front ground wheels 87, 88, 89 and 90 of the tractor. Each of the four front ground wheels 87 to 90 inclusive has the same diameter as the previously described front ground wheels 2 and 3, said diameter being between substantially 50% and substantially 60% of the overall diameter of any one of the six rear ground wheels 4 to 9 inclusive.

A beam 91 that extends substantially horizontally perpendicular to the direction A is welded or otherwise rigidly secured to the tops of the supports 85 and 86 in such a way that it projects by equal distances from the opposite sides of the plane of substantial symmetry of the tractor, said beam 91 being of generally similar construction and dimensions to the previously described supporting beams 10 and 11. The beam 91 serves principally to connect the front wheels 87 to 90 inclusive indirectly to the frame 1, said wheels being arranged in two pairs 87/88 and 89/90, each pair being arranged at a corresponding side of said plane of substantial symmetry of the tractor in symmetrical relationship with the other pair when the wheels are disposed for straight travel of the tractor. The upper ends of two supporting cylinders 92 and 93 are rigidly secured to the beam 91 at points which, as seen in plan view (FIG. 6), are located midway between the two wheels 87/88 and 89/90 of each pair. The supporting cylinders 92 ad 93 are substantially vertically disposed and lower cylindrical members of smaller diameter are telescopically received within the open downwardly directed ends of said cylinders 92 and 93. The arrangement is such that at least part of the length of each lower cylindrical member is always disposed internally of the corresponding supporting cylinder 92 or 93, helical springs being provided that are vertically disposed so as to bear between the bottom of the beam 91 and the tops of two axle beams 94 and 95 that are perpendicularly fastened to the lowermost ends of the cylindrical members and which correspond to the front ground wheels 87/88 and 89/90 respectively. The degree of axial overlap between the lower cylindrical members and the corresponding supporting cylinders 92 and 93 is always sufficient to ensure that coaxial alignment will be maintained even when non-axial forces of considerable magnitude act upon those parts. The front ground wheels 87 and 88 are rotatably mounted at the opposite ends of the short axle beam 94 and, similarly, the front ground wheels 89 and 90 are rotatably mounted at the opposite ends of the short axle beam 95. In order to provide for steering of the front ground wheels 87 to 90 inclusive, the lower cylindrical members that are received telescopically in the supporting cylinders 92 and 93 are provided, close to their perpendicular junctions with the axle beams 94 and 95, with generally rearwardly directed steering arms 96 and 97 and the rearmost ends of said arms 96 and 97 are pivotally interconnected by a track rod 98 which it is preferred should be of adjustable length. It is emphasized that the steering arms 96 and 97 and the interconnecting track rod 98 are illustrated only very diagrammatically in FIGS. 6 and 7 of the drawings since their construction and arrangement is basically conventional and does not form the subject of the present invention. In this embodiment, steering is effected hydraulically from a hydraulic control in the driving cabin 80. The piston rod of a hydraulic piston and cylinder assembly 99 that communicates with said control is pivotally connected to a lug carried by the track rod 98 or to the pivotal interconnection (not illustrated) between that track rod and the steering arm 96, the base end of the cylinder of said assembly 99 being pivotally connected to a bracket carried by the central beam of the frame 1 very close to the support 86.

In the embodiment of FIGS. 5 to 7 of the drawings, the four ground wheels 87 to 90 inclusive are not rockable, in common, about a substantially horizontal axis that is substantially parallel to the direction A. As an alternative, the two pairs 87/88 and 89/90 of front ground wheels are individually displaceable upwardly and downwardly relative to the beam 91 which beam is rigidly secured to the frame 1. The helical springs that are not visible in the drawings resiliently oppose displacment of the front ground wheels in at least an upward direction towards the beam 91 and, preferably, also in a downward direction away from that beam. In each of the two embodiments that has been described, there are six rear ground wheels 4 to 9 inclusive but it will be noted that the outermost two rear ground wheels 4 and 9 can optionally be disconnected from the remaining four ground wheels with a consequent reduction in the width of the path of travel of the tractor. FIGS. 6 and 7 of the drawings show the rear ground wheels 4 and 9 in broken lines to illustrate this point. It will be recalled that the housing 60 has a narrow width which is not greater than the thickness of any one of the rear ground wheels 4 to 9 inclusive so that there is thus ample space available for the four or six rear ground wheels. When only the four inner rear ground wheels 5, 6, 7 and 8 are used, their combined width or thickness in a horizontal direction that is perpendicular to the direction A (including the spacing between them), does not exceed substantially 200 centimeters, all four wheels, or all six wheels when the wheels 4 and 9 are provided, being driven from two axially aligned half shafts that co-operate with the same differential 61 and rotary driving shaft 64. The maximum overall width of substantially 200 centimeters which has just been mentioned is, it will be noted, not more than the permitted maximum width for road travel that is legally allowed in a number of countries. Even when the two "additional" rear wheels 4 and 9 are provided, the row of six wheels still has an overal width of not more that substantially 300 centimeters. The lower element 75 of the rear three-point lifting device or hitch 68 of the tractor is afforded principally by the arm 74, which is plate-shaped and has a width which is not greater than that of the housing 60. A stable and effective lifting device or hitch is achieved with this simple arrangement which is such that said arms 74 fits, with clearance, between the rear ground wheels 6 and 7, together with the housing 60, without the axial spacing between those ground wheels having to be very great.

When the tractor is in operation, all six of its rear ground wheels 4 to 9 inclusive, or only the central four of those ground wheels when the outer wheels 4 and 9 are removed, are driven by the two internal combustion engines 15 and 16 or by only a selected one of those engines, the other remaining inoperative. Unnecessary fuel consumption can be avoided, or considerably reduced, when the tractor is to undertake only light work because, under such circumstances, operation of one of the two engines 15 and 16 alone is quite sufficient and the other engine can remain inoperative. A subsidiary advantage of the provision of the two independent engines 15 and 16 is that, if a tractor having a single engine should suffer a serious engine failure at a point remote from its storage and service area, its recovery can present considerable difficulty, particularly if the breakdown should take place at a long distance from a public road. In the case of either embodiment of the tractor that has been described, the failure of one of the two engines 15 and 16 does not immobilize the tractor and the tractor can return to a service area without difficulty powered only by the engine that remains effective. The use of two engines of relatively low power rating in place of a single engine of relatively high power rating does not necessarily involve additional manufacturing cost and can even result in a less expensive tractor because the cost of two identical mass produced smaller engines may not be more, and can even be less, than the cost of one large engine that is produced in smaller numbers, the large engine having approximately double the power rating of each small engine.

The driver of the tractor normally use pedals or other clutch control members to couple the two engines 15 and 16 individually to the pinions 51 and 52 and the rotation of those pinions is transmitted by the further pinions 53 and 54 to the central pinion 55. The central pinion 55 is mounted on the input shaft 63 of the torque converter 62 and the rotary output shaft 64 from that torque converter drives the rear wheels 4 to 9 inclusive or 5 to 8 inclusive in a substantially conventional manner through the intermediary of the differential 61. The pinion 57 that is located between the beams 12 and 13 of the supporting frame (see FIG. 4) is driven from the smaller pinion 56, the pinion 56 also being mounted on the input shaft 63 of the torque converter 62. Thus the speed of rotation of the pinion 57 is independent of the transmission ratio set by the torque converter 62 and the leading and rear power take-off shafts 58 and 59 will thus rotate at a speed which does not depend upon the speed of travel of the tractor itself over the ground. When heavy work which requires a high tractive effort such, for example, as plowing, is to be undertaken, operation of both the engines 15 and 16 is required. However, the tractor may also be used for light work in which case one of the two engines 15 and 16 is left inoperative and the driver manipulates a lever or like control to set the corresponding clutch 49 or 50 in a condition in which it will not transmit torque. An example of an agricultural operation in which the use of only one of the engines is indicated is the sowing of seeds by employing a seed drill and, of course, one engine is entirely sufficient to drive the tractor along public roads and the like when supporting and/or towing inoperative tools and implements. Although the invention has been described in relation to two independently operable engines 15 and 16, the invention is not limited to the provision of only two such engines and it is within the scope thereof to provide a tractor which has more than two independent engines all or any one or more of which can be rendered operative for different tasks which the tractor may have to perform. In the embodiments that have been described, when the driver is facing forwardly with respect to the direction A, his view of the leading three-point lifting device or hitch 39 and any tool or implement that may be connected thereto is a direct unimpeded view because, despite the fact that the two engines 15 and 16 are located forwardly of the driving seat 82 with respect to the direction A, the wide space that exists between the innermost of their corresponding cowling plates 19 and 20 provides a direct line of sight between the seat 82 and said lifting device or hitch 39. As viewed in a direction opposite to the direction A (FIGS. 1 and 7), the driving seat 82 is located midway between the cowling plates 19 and 20 which principally define compartments for the corresponding engines 15 and 16. When the assembly which comprises the support 83 and the driving seat 82 has been turned through 180° about the axis 84 as compared with the position of the assembly that is illustrated in the accompanying drawings, the driver will still have a direct forward and downward view of the rear three-point lifting device or hitch 68 and of any tool or implement that may be operatively connected thereto. Under these circumstances, the forward direction of travel of the tractor will be opposite to the direction A. The invention has been described in its application to agricultural tractors but it will be appreciated that it may be employed with equal advantage in relation to other tractors and to certain vehicles, such as some that are used in civil engineering, which are not normally considered (in the popular sense) as being "tractors". Accordingly, the term "tractor" is to be interpreted throughout this Specification and claims broadly as including such vehicles within its scope.

Although various features of the two tractor embodiments described and illustrated in the accompanying drawings are set forth in the following claims as inventive features, it is emphasized that the invention is not necessarily limited to those features and includes within its scope each of the parts of the two tractor embodiments described, and is illustrated in the accompanying drawings, both individually and in various combinations.

Having thus described my invention, what I claim as new and desire to secure by Letters Patent of the United States is:

1. A tractor for agricultural purposes which comprises: a frame; a pair of front ground engaging wheels and a pair of rear ground engaging wheels mounted on said frame and providing support therefor; a lifting device mounted on the front of said frame and a further lifting device mounted on the rear of said frame; a driver's seat mounted on the same frame which is relatively remote from said front lifting device and proximate to said rear lifting device whereby an operator in said seat has a substantially unobstructed view of said rear lifting device; and a pair of engines operatively connected to said rear wheels, one of said engines mounted on each side of said frame whereby they are parallel to and spaced on either side of the longitudinal center line of the tractor, said engines being completely forward of said driver's seat and so positioned and spaced apart whereby an operator in said seat has a substantially unobstructed view of said front lifting device in a line-of-sight passing between said engines.

2. A tractor in accordance with claim 1, wherein a pair of clutches are provided, each clutch being directly connected to the output shaft of a corresponding engine and being separately controllable by an operator in said seat.

3. A tractor in accordance with claim 2, wherein non-variable transmission means is provided which couples said engines after said clutches, a torque converter being connected to said transmission means behind said engine and forward of said seat as seen in plan.

4. A tractor in accordance with claim 3, wherein forwardly and rearwardly directed output shafts are rotatably mounted on said frame and connected to said transmission means, a forward power take-off shaft being connected to said forwardly directed output shaft and a rear power take-off shaft being connected to said rearwardly directed output shaft, said output shafts each extending to a corresponding said lifting device whereby implements coupled to said lifting devices may be driven by said power take-off shafts.

5. A tractor in accordance with claim 4, wherein said power take-off shafts are connected via said forwardly and rearwardly directed output shafts and said transmission means to both said engines and are thereby in a driving connection to both said engines.

6. A tractor in accordance with claim 1, wherein means is provided for selectively turning said driving seat and control members provided therefor through 180° about a substantially vertical axis.

7. A tractor for agricultural purposes which comprises: a frame; a pair of front ground engaging wheels and a pair of rear ground engaging wheels mounted on and supporting said frame; a driver's seat mounted on said frame; a lifting device together with a forward power take-off shaft mounted on the front of said frame and a further lifting device with a rear power take-off shaft mounted on the rear of said frame; a pair of engines operatively connected to said rear wheels mounted on said frame; a pair of clutches, each said clutch being connected to the power output shaft of a corresponding said engine and being also connected to means for engaging and disengaging each clutch from each corresponding said engine by an operator in said driver's seat; a torque converter in driving connection with said rear wheels; non-variable transmission means, said transmission means interconnecting said clutches opposite a power output shaft of the corresponding engine and said torque converter; direct connection means connecting each said power take-off shaft with said transmission means whereby each said power take-off shaft is operable by both engines independently of the speed of the tractor which is governed by said torque converter.

8. A tractor in accordance with claim 7, wherein said engines are mounted in a parallel relationship completely forward of said driver's seat and are sufficiently spaced apart to provide an operator in said driver's seat with a substantially unobstructed view of said forward lifting device.

9. A tractor in accordance with claim 8, wherein said driver's seat is mounted on said frame whereby an operator in said driver's seat has a substantially unobstructed view of said rear lifting device.

10. A tractor in accordance with claim 7, wherein said transmission means comprises a train of at least five engaged gears.

* * * * *